No. 779,641.

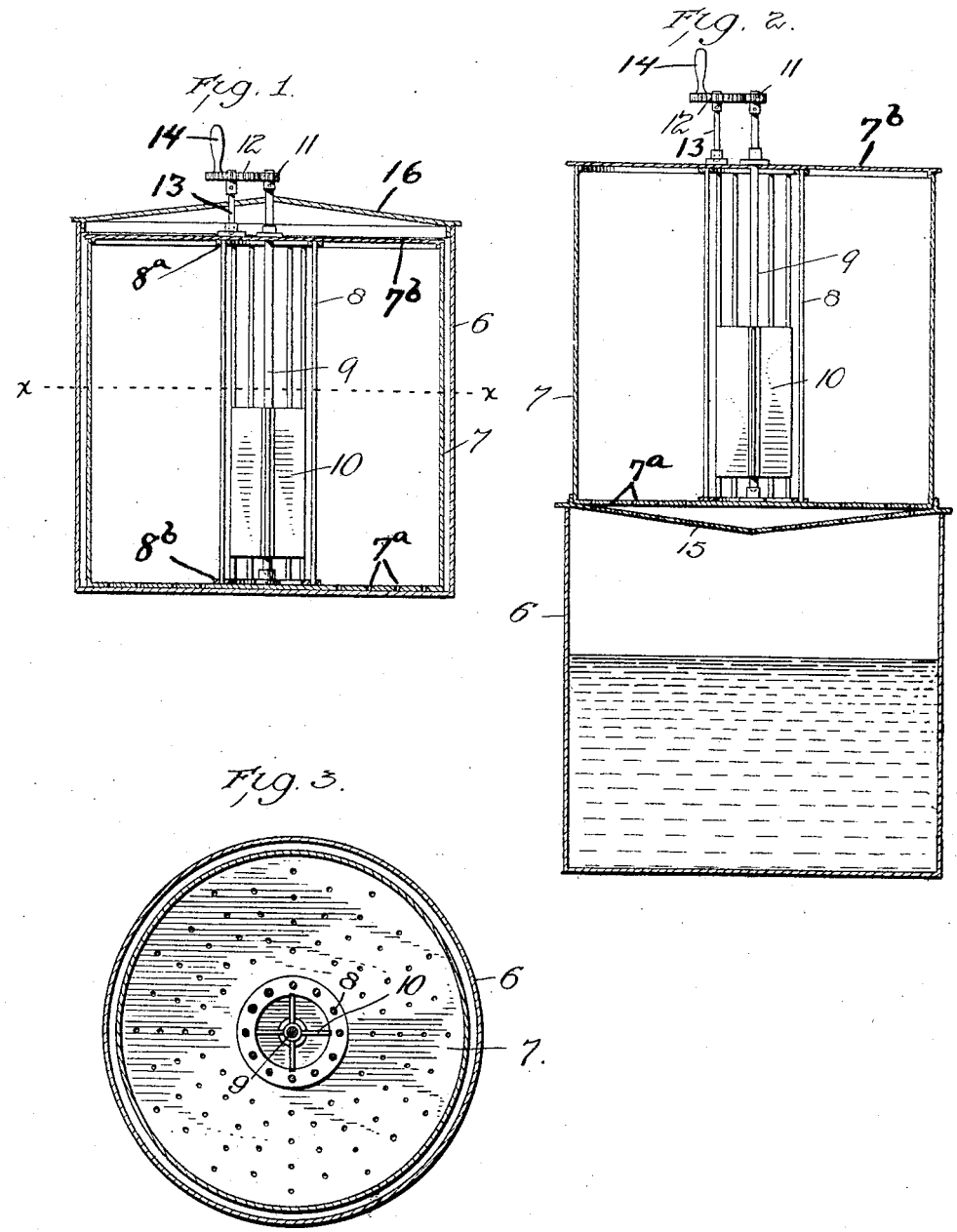

Patented January 10, 1905.

UNITED STATES PATENT OFFICE.

ERNEST CROSBY, OF ALEXANDRIA, MINNESOTA.

DISH-WASHING MACHINE.

SPECIFICATION forming part of Letters Patent No. 779,641, dated January 10, 1905.

Application filed February 24, 1904. Serial No. 195,073.

*To all whom it may concern:*

Be it known that I, ERNEST CROSBY, a citizen of the United States, residing at Alexandria, Minnesota, have invented certain new and useful Improvements in Dish-Washing Machines, of which the following is a specification.

My present invention relates to improvements in dish-washing machines; and the object of the invention is to provide a simple, economical, durable, and effective machine in which dishes may be quickly and easily cleansed and thereafter dried without handling or removal from the apparatus. I have also aimed to so construct the device that the number of parts within the apparatus and exposed to the action of the washing-water shall be reduced to a minimum and of such a nature that they may be readily cleansed, thus making the device of an extremely-sanitary nature.

The invention is illustrated in the accompanying drawings, in which—

Figure 1 is a central vertical section showing the apparatus with the parts in position for washing the dishes. Fig. 2 is a similar view with the parts in position for draining and drying. Fig. 3 is a cross-section taken on the line $x\ x$ of Fig. 1.

In the figures similar reference characters indicate the same parts wherever used.

The numeral 6 indicates a main or water receptacle adapted to contain the cleansing-water. A second receptacle 7 is designed to hold the dishes to be washed and is of a size to adapt it to fit within the receptacle 6, and its bottom is provided with a plurality of perforations $7^a$, which permit the entrance of the water from the receptacle 6 into the receptacle 7. A cage 8, which consists of vertical rods having thin upper and lower ends connected, respectively, to rings $8^a$ and $8^b$, rests removably within the receptacle 7, the dishes to be washed being piled around the cage. Within the cage is located a fan 10, carried by a vertical shaft 9, journaled in a step-bearing $9^a$ at the bottom and in the plate or bar $7^b$ at the top, through which it projects. This shaft carries at its upper end a gear-wheel 11, which meshes with a gear 12, mounted on a short shaft 13 and having an operating crank-handle 14.

In the operation of the device the receptacle 7 with the dishes piled around the cage is placed within the lower receptacle, as indicated in Fig. 1, and the rotation of the fan by the handle causes the water to be violently agitated and forced around among the dishes, whereby they are effectually cleaned. After this action has been continued for a desired length of time the receptacle 7 is removed from the receptacle 6 and supported above the same by a perforated plate 15, which is preferably of slightly-conical shape, and in this position the dishes are allowed to drain, after which the fan may be rotated to force a current of air around among the dishes to dry the same.

If desired, a cover 16 may be used to prevent splashing over of the water during the washing operation.

Having thus described my invention, what I claim is—

In a dish-washing machine an outer water-receptacle, an inner receptacle having a perforated bottom, a cylindrical cage centrally disposed within the inner receptacle, a vertical shaft journaled centrally within said cage, a plurality of radial wings or blades carried by said shaft, means for rotating said shaft, and means for supporting the inner receptacle above the outer to permit drainage of the dishes and drying thereof, substantially as described.

In testimony whereof I affix my signature in presence of two witnesses.

ERNEST CROSBY.

Witnesses:
 GEO. L. TREAT,
 J. S. COWEN.